US008285606B2

(12) United States Patent
Doubet (10) Patent No.: US 8,285,606 B2
(45) Date of Patent: Oct. 9, 2012

(54) ENABLING COUNTRY OF ORIGIN LABELING AND VERIFICATION FOR LIVESTOCK PRODUCTS

(76) Inventor: James T. Doubet, Parker, CO (US)

( * ) Notice: Subject to any disclaimer, the term of this patent is extended or adjusted under 35 U.S.C. 154(b) by 1760 days.

(21) Appl. No.: 10/668,533

(22) Filed: Sep. 23, 2003

(65) Prior Publication Data

US 2005/0065862 A1    Mar. 24, 2005

(51) Int. Cl.
G06Q 10/00 (2012.01)
(52) U.S. Cl. .......................................... 705/28
(58) Field of Classification Search ............... 705/28, 705/22, 1, 1.1
See application file for complete search history.

(56) References Cited

U.S. PATENT DOCUMENTS

| | | | | |
|---|---|---|---|---|
| 5,673,647 | A * | 10/1997 | Pratt | 119/51.02 |
| 6,342,839 | B1 * | 1/2002 | Curkendall et al. | 340/573.3 |
| 6,510,380 | B1 * | 1/2003 | Curatolo et al. | 701/207 |
| 6,565,000 | B2 * | 5/2003 | Sehr | 235/384 |
| 6,778,872 | B2 * | 8/2004 | Jorgenson et al. | 700/106 |
| 6,997,140 | B2 * | 2/2006 | Finlayson | 119/858 |
| 7,234,421 | B2 * | 6/2007 | Natividade et al. | 119/720 |
| 2002/0095232 | A1 * | 7/2002 | Jorgenson et al. | 700/99 |
| 2002/0133359 | A1 * | 9/2002 | Brown | 705/1 |
| 2003/0062001 | A1 * | 4/2003 | Andersson | 119/174 |
| 2003/0170357 | A1 * | 9/2003 | Garwood | 426/392 |
| 2003/0177025 | A1 * | 9/2003 | Curkendall et al. | 705/1 |
| 2003/0228604 | A1 * | 12/2003 | Plastow et al. | 435/6 |
| 2004/0078390 | A1 * | 4/2004 | Saunders | 707/104.1 |
| 2004/0200892 | A1 * | 10/2004 | Curkendall et al. | 235/376 |
| 2005/0038741 | A1 * | 2/2005 | Bonalle et al. | 705/40 |
| 2005/0065862 | A1 * | 3/2005 | Doubet | 705/28 |
| 2005/0075900 | A1 * | 4/2005 | Arguimbau, III | 705/1 |

OTHER PUBLICATIONS

Roen, Sarah L., "Video auction to certify cattle origin", *Western Livestock Journal*, Jul. 15, 2003.
J. VanSickle, et al., "Country of Origin Labeling: A Legal and Economic Analysis", PBTC 03-5, May 2003, International Agricultural Trade and Policy Center, University of Florida, pp. 1-24.
"Subtitle D—Country of Origin Labeling", Farm Security and Rural Investment Act of 2002, Public Law 107-171 (7 U.S.C. 1638-1638d), May 1, 2002.
"2002 Farm Bill Provisions, Country of Origin Labeling", Agricultural Marketing Service, United States Department of Agriculture, Sep. 23, 2003, <http://www.ams.usda.gov/cool>, p. 1-2 of 2.
"2002 Farm Bill Provisions, Country of Origin Labeling, Examples of records that may be useful for COOL verification purposes", Agricultural Marketing Service, United States Department of Agriculture, Sep. 23, 2003, <http://www.ams.usda.gov/cool/records.htm>, p. 1 of 1.

(Continued)

*Primary Examiner* — Seye Iwarere
(74) *Attorney, Agent, or Firm* — Marcia L. Doubet (57) ABSTRACT

Techniques are disclosed that enable country of origin labeling and verification. A source verification or "animal passport" procedure and system are disclosed, whereby each transfer of one or more animals is documented and recorded in a repository. An animal passport (i.e., certificate) is used for tracking transfers. A new passport is issued for every transfer, and a unique number (or other unique identifier) is assigned to each such passport. At the same time, each passport carries the passport number of the preceding transfer (or transfers), such that a sequence of passport numbers identifies all transfers occurring throughout the lifetime of the associated animal or animals. Animal passports may also be used to track transfers of animal products.

19 Claims, 8 Drawing Sheets

OTHER PUBLICATIONS

"Cattle, Beef, Muscle Cuts of Beef, Ground Beef", Agricultural Marketing Service, United States Department of Agriculture, Sep. 23, 2003, <http://www.ams.usda.gov/cool/coolbeef.pdf>, p. 1 of 1.

"ers analysis, country-of-origin labeling", Economic Research Service, United States Department of Agriculture, Sep. 23, 2003, <http://ers.usda.gov/Features/farmbill/analysis/cool.htm>, p. 1-3 of 3.

"Questions and Answers on Country of Origin Labeling", Agricultural Marketing Service, United States Department of Agriculture, Sep. 23, 2003, <http://www.ams.usda.gov/cool/FAQ2.htm>, p. 1-2 of 2.

* cited by examiner

Country of Origin Certificate of Transfer 205

PASSPORT NUMBER: 03000001 212

Number of animals transferred 210 100  Description of animals transferred
Location of Transfer Cody, WY 214  Date of Transfer 01/31/2003 216

220 As Transferor, I hereby certify that animals covered by this Passport were on my premises within the United States from the date of any previous Passport identified below until the date of the present transfer.

230 TRANSFEROR:  Ranch A
(signature of transferor)

240 As Transferee, I hereby certify that I took possession of the animals covered by this Passport on the date, and at the location, stated above.

250 TRANSFEREE:  Auction Barn
(signature of transferee)

260 Capacity of Transferee:
Auction Barn  X   Livestock Dealer/Agent _____
Stocker/Backgrounder _____   Feedlot _____

270 PREVIOUS PASSPORT INFORMATION:
Passport Number _____   Number of Animals _____
Passport Number _____   Number of Animals _____
Passport Number _____   Number of Animals _____
Passport Number _____   Number of Animals _____
Passport Number _____   Number of Animals _____
Passport Number _____   Number of Animals _____

Country of Origin Certificate of Transfer

310  305 PASSPORT NUMBER: 04004321

Number of animals transferred __40__   Description of animals transferred ______
Location of Transfer __Cheyenne, WY__   Date of Transfer __02/01/2003__

330 As Transferor, I hereby certify that animals covered by this Passport were on my premises within the United States from the date of any previous Passport identified below until the date of the present transfer.

350 TRANSFEROR: Auction Barn
(signature of transferor)

As Transferee, I hereby certify that I took possession of the animals covered by this Passport on the date, and at the location, stated above.
TRANSFEREE: Feedlot A
(signature of transferee)

Capacity of Transferee:
Auction Barn ______   Livestock Dealer/Agent ______
Stocker/Backgrounder ______   Feedlot __X__

370 PREVIOUS PASSPORT INFORMATION:
Passport Number __03000001__   Number of Animals __40__   371
Passport Number ______   Number of Animals ______
Passport Number ______   Number of Animals ______
Passport Number ______   Number of Animals ______
Passport Number ______   Number of Animals ______
Passport Number ______   Number of Animals ______

FIG. 3B

Country of Origin Certificate of Transfer                                      *385*

PASSPORT NUMBER: 09090909

Number of animals transferred __87__    Description of animals transferred ______
Location of Transfer __Cheyenne, WY__    Date of Transfer __02/01/2003__

As Transferor, I hereby certify that animals covered by this Passport were on my premises within the United States from the date of any previous Passport identified below until the date of the present transfer.
TRANSFEROR: Auction Barn
(signature of transferor)

As Transferee, I hereby certify that I took possession of the animals covered by this Passport on the date, and at the location, stated above.
TRANSFEREE:  Feedlot B
(signature of transferee)

Capacity of Transferee:
Auction Barn ______ Livestock Dealer/Agent ______
Stocker/Backgrounder ______   Feedlot __X__

PREVIOUS PASSPORT INFORMATION:
Passport Number __03000001__   Number of Animals __60__   *391*
Passport Number __02000200__   Number of Animals __27__   *392*
Passport Number ______        Number of Animals ______
Passport Number ______        Number of Animals ______
Passport Number ______        Number of Animals ______
Passport Number ______        Number of Animals ______

Registration of Transferor

410 — Date ______

405 TRANSFEROR CONTACT INFORMATION:

420 Parties authorized to sign on behalf of Transferor:

430 Identification used for Transferor's animals:

440 Number of animals transferred annually, and number of transfers:

| | Number Transferred | Number of Transfers |
|---|---|---|
| Steer calves | ______ | ______ |
| Heifer calves | ______ | ______ |
| Bulls | ______ | ______ |
| Cows | ______ | ______ |
| ... | | |

Source Verification

Enter current passport number: 09090909 — 610

620 {
This passport covers [87] — 621 animal(s), which were transferred from [Auction Barn] — 622 to [Feedlot B] — 623 on [02/01/2003] — 624 at [Cheyenne, WY] — 625
}

The animal(s) in this group were previously transferred under the following passport(s). Click on a passport number to see details.

630 {
1. [03000001]   2. [02000200]
}

The passport(s) indicate that this group of animals ● does   ○ does not — 640  qualify for a United States country of origin claim under the 2002 Farm Act.

[ OK ]   [ Cancel ]   [ Reset ]

| | 701 Passport Number | 702 Transfer Date | 703 Transferor | 704 Transferee | 705 Number Head | 706 U.S. Only? | 707 Previous Passport Number(s) |
|---|---|---|---|---|---|---|---|
| 710 | 04004321 | 02/01/2003 | Auction Barn | Feedlot A | 40 | yes | 03000001 |
| 720 | 09090909 | 02/01/2003 | Auction Barn | Feedlot B | 87 | yes | 02000200, 03000001 |
| 730 | 03000001 | 01/31/2003 | Ranch A | Auction Barn | 100 | yes | none |

700

ENABLING COUNTRY OF ORIGIN LABELING AND VERIFICATION FOR LIVESTOCK PRODUCTS

FIELD OF THE INVENTION

The present invention relates to livestock (such as cattle, sheep, and hogs) and livestock products (such as beef, lamb, and pork), and more particularly to techniques that enable country of origin labeling and verification thereof.

BACKGROUND OF THE INVENTION

According to the Foreign Agricultural Service ("FAS") of the United States Department of Agriculture ("USDA"), approximately 2.5 million cattle were imported into the United States in calendar year 2002. Of these 2.5 million cattle, approximately 1.02 million (or roughly 40.8 percent) were imported for "direct slaughter". See "Country of Origin Labeling: A Legal and Economic Analysis", J. VanSickle et al., PBTC 03-5, University of Florida Institute of Food and Agricultural Sciences (May 2003), p. 10, citing statistics from the USDA's FAS Web site.

That is, these 1.02 million cattle were imported into the U.S. for delivery to slaughterhouses or meat packing plants (hereinafter, "packers"), where they were to be slaughtered prior to undergoing various forms of processing. The remaining 1.48 million cattle imports were destined for farms, feedlots, and so forth, and therefore many of these imported cattle will also eventually reach the packers after spending additional time in the United States (e.g., to be fattened in a feedlot).

Some of the meat derived from cattle imported into the U.S. for processing is subsequently exported for sale, and some remains in the U.S., where it is sold to various purchasers (including retail outlets which sell meat products for purchase by consumers).

A large number of cattle are also exported from the U.S. every year. In some cases, these cattle are slaughtered after export and the resulting carcasses are imported back into the U.S. for processing such as cutting and packaging. In addition, carcasses from cattle slaughtered in the U.S. may be exported to other countries for processing, after which the processed meat may be imported into the U.S. for sale.

In today's global economy, this shipping of live animals and of meat from one country to another is increasingly common. It is also common for meat products to be sold which are mixtures of ingredients from more than one country. Ground beef sold in American supermarkets, for example, often contains a mixture of imported and domestic beef and beef trimmings.

A large number of consumers may be unaware that the meat they purchase at their local supermarket is of foreign origin or has undergone foreign processing. Recent media coverage of health issues such as genetically-altered animals and bovine spongiform encephalopathy (commonly referred to as "mad cow disease") has increased consumers' concerns about the origin of their meat.

Legislation has recently been passed in the U.S. that will require specified "covered commodities" to include country-of-origin labeling by Sep. 30, 2004. See Farm Security and Rural Investment Act of 2002 (commonly referred to as the "2002 Farm Act" or "2002 Farm Bill"), Public Law 107-171 (7 U.S.C. 1638-1638d), subtitle D, "Country of Origin Labeling". Covered commodity, as defined therein, includes "muscle cuts of beef, lamb, and pork" as well as "ground beef, ground lamb, and ground pork". Id., §281 (2)(A). (Other covered commodities include fish, peanuts, and perishable agricultural commodities.)

This legislation states that retailers shall inform consumers of the country of origin of covered commodities. Id., §282 (a)(1). A label, stamp, mark, placard, or other clear and visible sign must be used for this purpose. Id., §282 (c). For beef, lamb, and pork, a covered commodity may be designated as having a U.S. country of origin only if it is exclusively from an animal that was born, raised, and slaughtered in the United States (with a narrowly-written caveat pertaining to the transportation of cattle). Id., §282 (a)(2)(A)-(C).

Furthermore, this legislation states that the Secretary of Agriculture may require a verifiable recordkeeping audit trail, with which compliance can be verified, and that suppliers of covered commodities shall provide information to retailers indicating the country of origin of a covered commodity. Id., §282 (d), (e). However, a mandatory identification system shall not be used by the Secretary of Agriculture. Id., §282 (f)(1).

Voluntary interim guidelines for country of origin labeling have been developed, and apply until regulations for a mandatory procedure are finalized. These voluntary guidelines are published in the Federal Register at Vol. 67, No. 198, pp. 63367-63375 (Oct. 11, 2002), titled "Establishment of Guidelines for the Interim Voluntary Country of Origin Labeling of Beef, Lamb, Pork, Fish, Perishable Agricultural Commodities, and Peanuts Under the Authority of the Agricultural Marketing Act of 1946" (hereinafter, "the Voluntary Guidelines"). The Voluntary Guidelines state that "suppliers throughout the production/marketing chain have a responsibility to maintain the necessary supporting records" for country of origin claims, and that self-certification is insufficient. Id., p. 63374, §3, "Recordkeeping", subsections (B), (C).

Accordingly, techniques are needed that enable compliance with this legislation, and more particularly, with the country of origin labeling and verification mandates described therein.

SUMMARY OF THE INVENTION

It is an object of the present invention to provide techniques for enabling country of origin labeling and verification.

It is another object of the present invention to define techniques for recordkeeping to support country of origin claims.

Still another object of the present invention is to enable third-party verification of country of origin claims.

Yet another object of the present invention is to provide techniques for recording animal transfers to support country of origin claims.

Another object of the present invention is to provide techniques for tracking animals and/or animal products.

According to preferred embodiments, an "animal passport" is issued to animals upon transfer from one party to another. A unique passport number is assigned to the transferred animals, as a group. When any animals from that group are subsequently transferred, a new unique passport number is assigned to this subsequent transfer, and that new passport number is associated with the previous passport number. In a similar manner, passport numbers are assigned to any other transfers, and the previous passport number is associated therewith, throughout an animal's lifetime. These passport numbers are recorded in a repository, and provide a verifiable audit trail that may be used in country of origin labeling and/or verification. Passports may also, or alternatively, be used for transfers of animal products. Optionally, passports may be used to track other information such as vaccinations and management issues.

DETAILED DESCRIPTION OF EMBODIMENTS

The present invention provides novel techniques that enable country of origin labeling and verification. A source verification procedure and system are disclosed, whereby each transfer of one or more animals (and/or animal products) is documented and recorded in a repository. This source verification procedure and system are also referred to herein as an "animal passport" system, since an animal passport (i.e., certificate) is used for tracking transfers. A new passport is issued for every transfer, and a unique number is assigned to each such passport. At the same time, each passport carries the passport number of the preceding transfer (or transfers), such that a sequence of passport numbers can be established to identify all transfers occurring throughout the lifetime of the associated animal or animals (and/or for the associated animal products, as appropriate). (Hereinafter, preferred embodiments are described with reference to transfers of live animals. This is by way of illustration and not of limitation. Furthermore, while preferred embodiments are described with reference to passport "numbers", this is for ease of reference. Other unique passport identifiers may be used as well, such as unique character strings or combinations of characters and numbers.)

As stated earlier, the country of origin labeling requirements outlined in the 2002 Farm Act state that a mandatory identification system shall not be used. Id., §282 (f)(1). This latter clause is interpreted to mean that per-animal identification cannot be required. The animal passport system of preferred embodiments is therefore adapted for transfers of groups of animals, and is described herein with reference to animal groups. However, techniques disclosed herein may also be used advantageously on a per-animal basis if desired, and use of animal passports for individual animals is therefore within the scope of the present invention.

In addition to not requiring individual animal identification, the source verification techniques disclosed herein are designed to provide a verifiable, auditable trail that is held by an independent third party, while minimizing cost and time requirements for participating suppliers and retailers (thereby minimizing cost increases that may need to be passed on to consumers).

Animal passports are described herein as printed documentation, and preferred embodiments are discussed in terms of information that may be extracted from that documentation and entered into a data repository maintained by the third party. However, this is for purposes of illustration and not of limitation. As one alternative, animal passports may be created in electronic form (thereby eliminating the need for paper forms and transfer of information from those forms), and such alternatives are within the scope of the present invention.

Paper-based animal passport forms may optionally be printed on tamper-evident paper (using watermarks, for example). Machine-readable information may optionally be printed on animal passports. For example, a barcode version or other scannable representation may be used when printing the unique passport number on an animal passport. Electronically-generated animal passports may be encoded, preferably using existing encoding techniques (such as digital watermarks), to prevent forgery.

Figure 1:
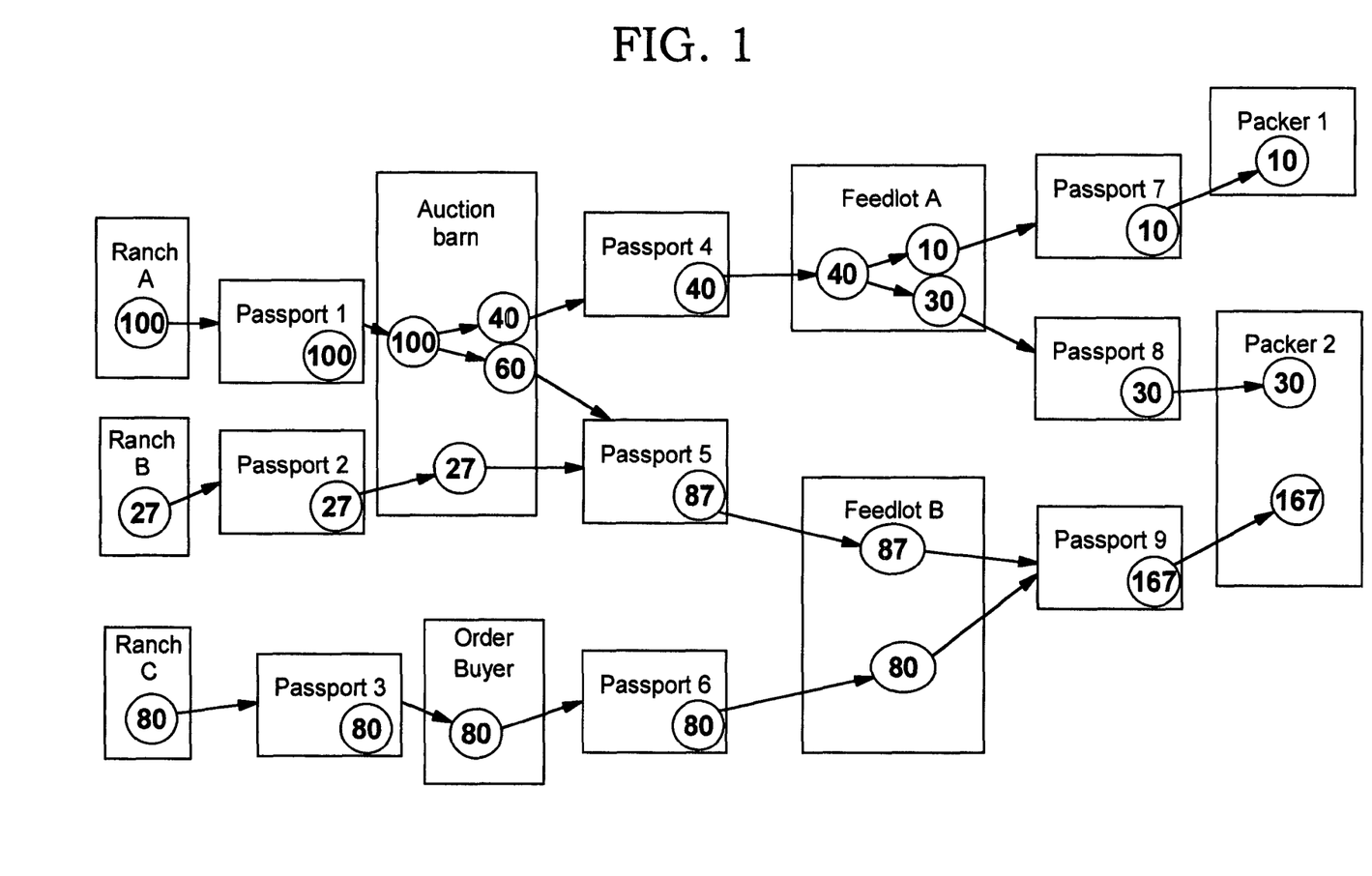
FIG. 1 provides a diagram illustrating use of animal passports to track animal transfers.

FIG. 1 illustrates use of animal passports to track animal transfers. In this example, a group of animals is born on a ranch (referred to as "Ranch A") located within the United States. At some point, 100 of these animals are transported to a party referred to as "Auction Barn" in the figure. According to preferred embodiments, an animal passport is created to document this transfer of 100 animals from Ranch A to Auction Barn, and "Passport 1" represents this transfer. (FIG. 1 uses the notation of an encircled number to represent the number of animals in a particular group, and passport numbers are represented therein using single digits for ease of illustration.) Passport 1 is described in more detail with reference to FIG. 2, below (where a sample passport number of "03000001" is used).

At auction, suppose 40 of the 100 animals from Ranch A are sold to a new owner, "Feedlot A". According to preferred embodiments, a new animal passport (denoted as "Passport 4" in the figure) is created to document this transfer. Passport 4, representing a subsequent transfer of a portion of the animals covered by a previous passport, is described in more detail with reference to FIG. 3A (where the passport number "04004321" is used).

Further suppose that "Ranch B" transferred 27 animals to Auction Barn, where "Passport 2" represents that transfer, and that these 27 animals are sold, along with the remaining 60 animals from Ranch A, to a new owner "Feedlot B". To document this transfer of 87 animals from Auction Barn to Feedlot B, "Passport 5" is created. Passport 5 is described in more detail with reference to FIG. 3B (where the passport number "09090909" is used).

Note that while discussions herein refer to issuing a new passport upon a transfer of ownership, this is by way of illustration and not of limitation. Passports may be issued for other types of transfer, including but not limited to custodial or possessory transfers.

Figure 2:
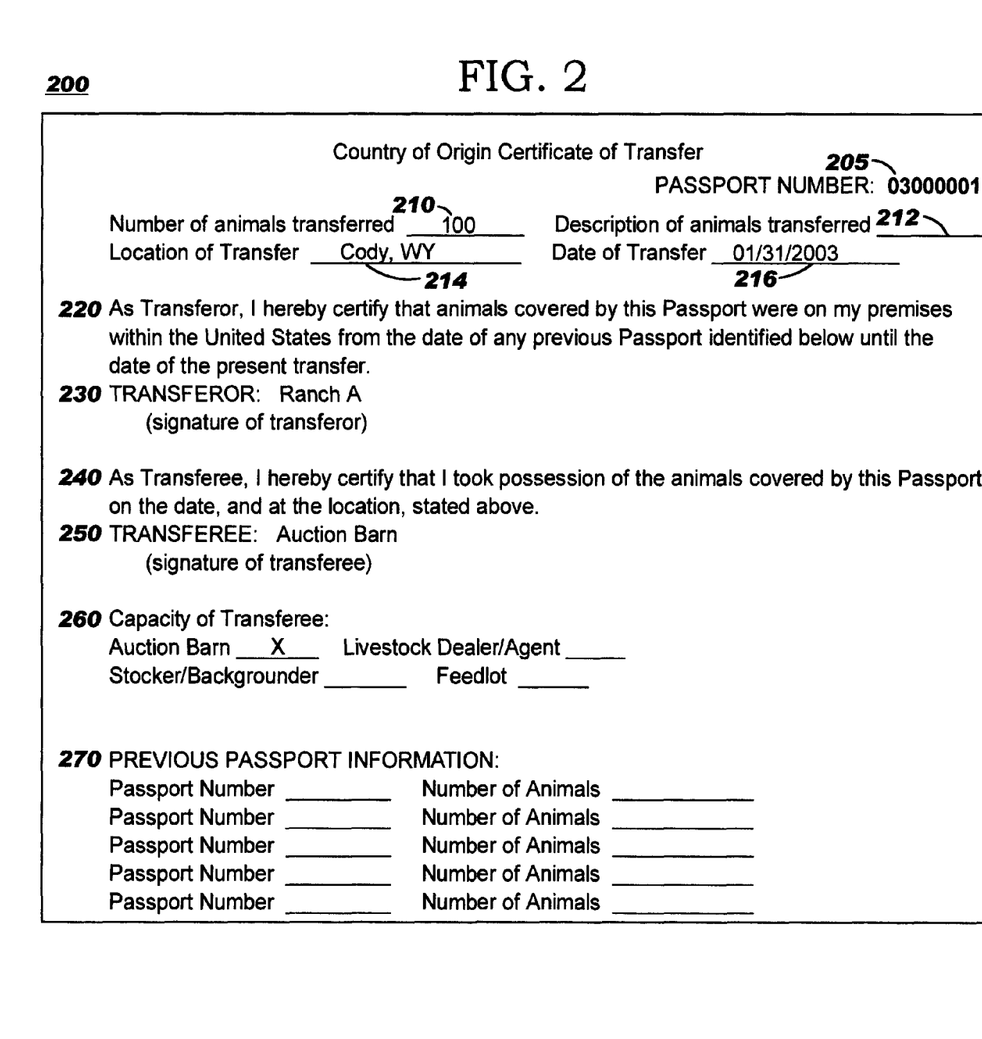
FIG. 2 provides a sample animal passport that may be issued upon a first transfer of an animal or group of animals.

In the example shown in FIG. 1, the animal passport denoted as "Passport 1" is the original passport for this group of animals. A sample passport 200 documenting a first transfer of this type is shown in FIG. 2. As shown therein, a unique passport number 205 ("03000001", in this example) is associated with passport 200, and a section 270 usable for recording previous passport numbers associated with the transferred animals is empty in this case.

As discussed above, preferred embodiments use a single passport for an entire group of animals being transferred. Therefore, sample passport 200 provides for a specification of the number of animals transferred in the present group and a description of those animals. See reference numbers 210 and 212, respectively. (The animal description may be made with reference to physical characteristics of the animals and/or with reference to identifiers such as brands, tattoos, ear tags, biometric identification, and so forth.) In addition, the location 214 and date 216 of the transfer are specified in preferred embodiments.

This sample passport 200 also provides a record of the transferring parties, which are identified in this example passport format as the transferor (e.g., seller or seller's agent) and the transferee (e.g., buyer or buyer's agent). See reference numbers 230 and 250, respectively. According to preferred embodiments, each party signs and dates the passport 200, affirming or certifying the transfer.

While the Voluntary Guidelines state that self-certification is not sufficient, as noted above, this is interpreted to mean that a third party must be involved for maintaining information used in verifying audit trails for country of origin claims. (Notably, the 2002 Farm Act legislation is silent on the topic of self-certification.) Thus, in preferred embodiments, each party signing an animal passport certifies information within the knowledge and belief of that party. (In an actual animal passport implementation, the statements 220, 240 shown above the parties' signatures may be altered from the sample language shown in FIG. 2, without deviating from the scope of the present invention.)

Signatures on an animal passport may optionally be used to verify ownership transfers, for example, if a country of origin claim is audited.

It may happen that additional signatures are provided on animal passports. For example, signatures of transferring parties may require notarization in some cases, and thus a passport format may be used which accommodates such additional signatures.

Optionally, the transferee's capacity may be indicated, as shown at 260. If the new owner is not physically present at the time of sale or transfer, for example, a buyer's agent might sign the passport at reference number 250. (In some cases, it may be useful to specify the transferor's capacity as well, although this has not been illustrated in the sample passports. For example, a seller's agent might be authorized to sign on behalf of the seller.)

As described below with reference to FIG. 5, a copy of the new passport is provided to the transferor and the transferee, and a copy (which is preferably the signed original) is also submitted to the third party.

Returning now to the transfer scenario depicted in FIG. 1, the 127 animals transferred to Auction Barn are sold, in this example, to Feedlot A and Feedlot B, and according to preferred embodiments, new passports "Passport 4" and "Passport 5" are created to record both of these transfers. These new passports will now be described with reference to the sample passports 300 and 380 in FIGS. 3A and 3B.

According to preferred embodiments, a single passport format is used, whether that passport documents an original or first transfer (illustrated by sample passport 200 in FIG. 2) or a transfer of animals for which one or more existing animal passports have previously been created. Thus, sample passports 300 and 380 in FIGS. 3A and 3B use the same format illustrated in FIG. 2.

Figure 3A:
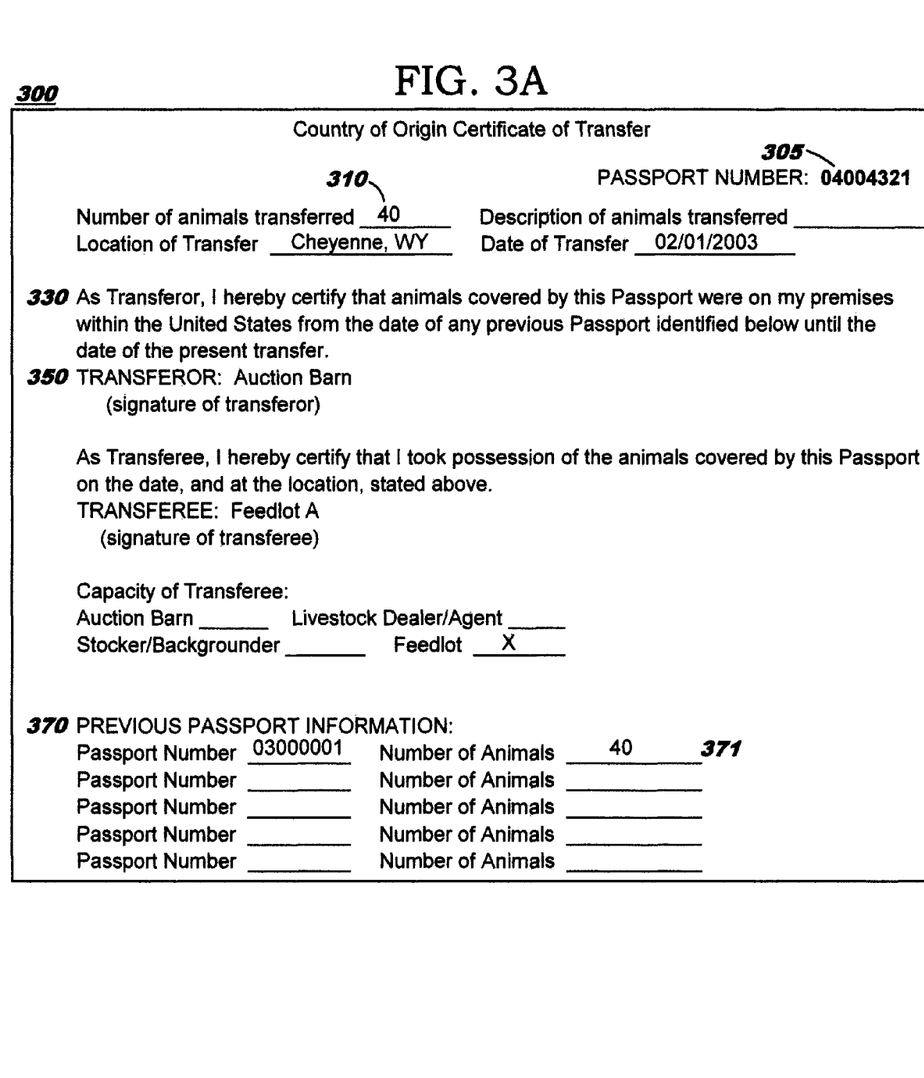
FIGS. 3A and 3B show samples of an animal passport issued upon transfer of animals already covered by existing animal passports.

Referring first to FIG. 3A, in this example, sample passport 300 corresponds to "Passport 4" in FIG. 1, and represents 40 of the 100 animals from Ranch A. As stated above, a new passport number is associated with each transfer, and this number ("04004321", in the example) is represented at reference number 305. Information pertaining to this transfer, such as the number and description of animals, location and date of transfer, and identification of the transferring parties (as well as signatures thereof, etc.) is preferably provided in an analogous manner to that which has been described with reference to FIG. 2.

Notably, however, section 370 in this subsequent-transfer example records the previous passport number associated with the transferred animals. In the hypothetical transfer, these 40 animals (as noted at reference number 310) were purchased by this buyer ("Feedlot A") from Auction Barn (as shown at reference numbers 330 and 350), and a previous transfer for those 40 animals is documented in animal passport "03000001" (see reference number 371). This passport "03000001" is exemplified by sample passport 200 of FIG. 2.

Figure 3B:
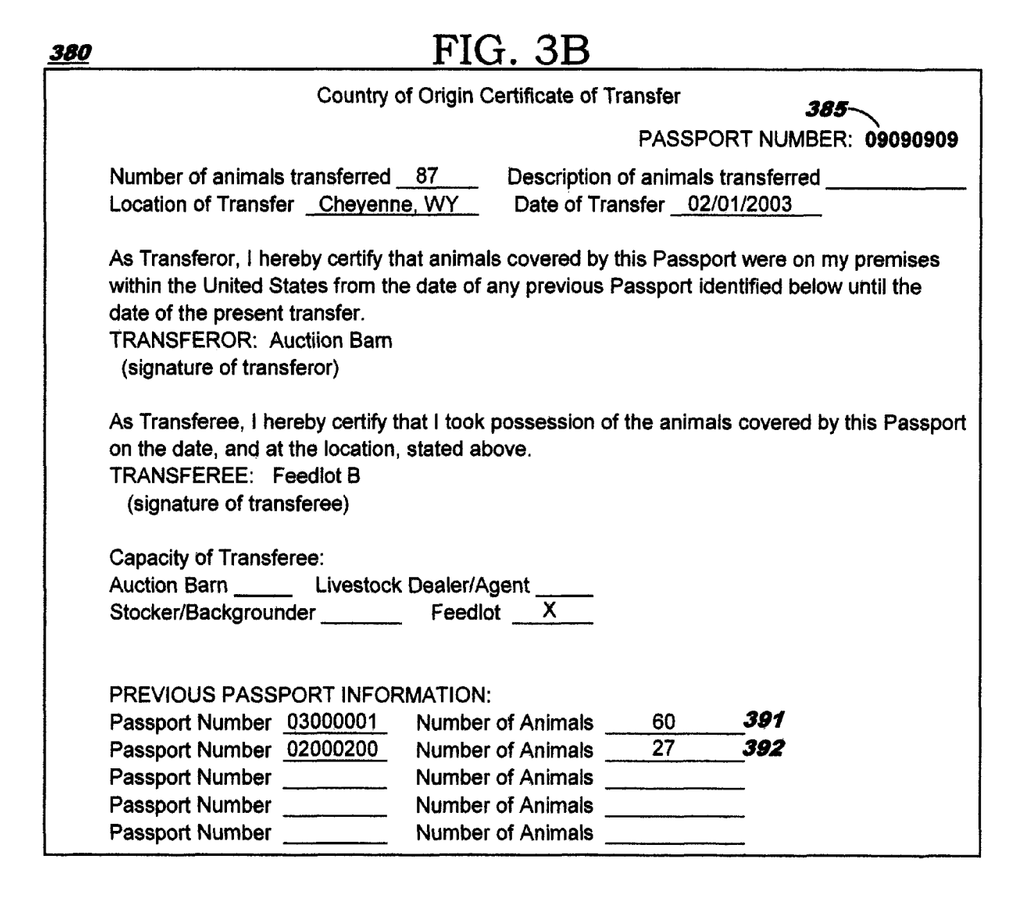

An animal passport 380 created to record the sale of 87 animals from Auction Barn to Feedlot B, shown in FIG. 3B, references passport "03000001" (see reference number 391) and also passport "02000200" (see reference number 392) since in the example, the 87 animals in this transfer originated from two separate groups.

The transfers documented by Passport 4 and Passport 5 in the example scenario illustrated in FIG. 1 show animals from one source being split into two groups for a subsequent transfer and animals from two sources being combined into one group for a subsequent transfer. In both cases, a separate passport is created for the subsequent transfer, and each of those passports has its own unique passport number, as stated earlier. Each passport also records, in preferred embodiments, the previous passport number with which each group of animals was most recently transferred.

Additional transfers depicted in FIG. 1 will now be described.

Suppose the 40 animals transferred to Feedlot A are eventually split into two groups having 10 and 30 animals, and that the group of 10 animals is sold to "Packer 1" while the group of 30 animals is sold to "Packer 2". Two additional passports are created to document these transfers, in preferred embodiments, and are illustrated in FIG. 1 as "Passport 7" and "Passport 8", respectively. Each of these uniquely-numbered passports will refer to the previous passport for its covered animals, which in both cases will be passport "04004321" (shown in FIG. 3A). Packer 1 can therefore trace the origin of its 10 head of cattle back to the transfer of 40 cattle from Auction Barn to Feedlot A, and then back to the transfer of 100 cattle from Ranch A to Auction Barn. Similarly, Packer 2 can trace its 30 head of cattle back through the sequence of transfers to the original 100 head of cattle from Ranch A.

FIG. 1 also shows 80 head of cattle transferred from "Ranch C" to "Order Buyer", where this transfer is documented in "Passport 3". Subsequently, Order Buyer transfers these 80 cattle to Feedlot B, as denoted in the example by "Passport 6". Feedlot B therefore has a total of 167 cattle, in the example, and at some point, these 167 cattle are transferred to Packer 2, as denoted by "Passport 9". Passports 3 and 6 will each refer to a single previous transfer, in this example, and Passport 9 will refer to two previous transfers (in a similar manner to that which has been depicted at reference numbers 391 and 392 in FIG. 3B).

Preferably, animal passports are also used to record transfers of animal products such as meat. Therefore, Packer 1 and Packer 2 create new animal passports for each transfer to retailers (or other intermediaries, as appropriate), where the previous passport number(s) therein refer to the passport number(s) documenting transfer of the live animals to the respective packer.

As demonstrated by these examples, the animal passport system disclosed herein is easy to use and enables tracking animals through various transfers (while not requiring individual animal identification).

According to preferred embodiments, a number of the parties using animal passports are registered with the third party. In particular, at a minimum, each transferor must be registered, according to techniques disclosed herein. This registration will now be described with reference to the sample registration form 400 depicted in FIG. 4. As shown therein, a variety of information may be deemed useful by the third party. The name and contact information for each transferor, as illustrated at reference number 405, is specified on the registration form, and a date 410 upon which the form was completed is preferably specified as well.

Figure 4:
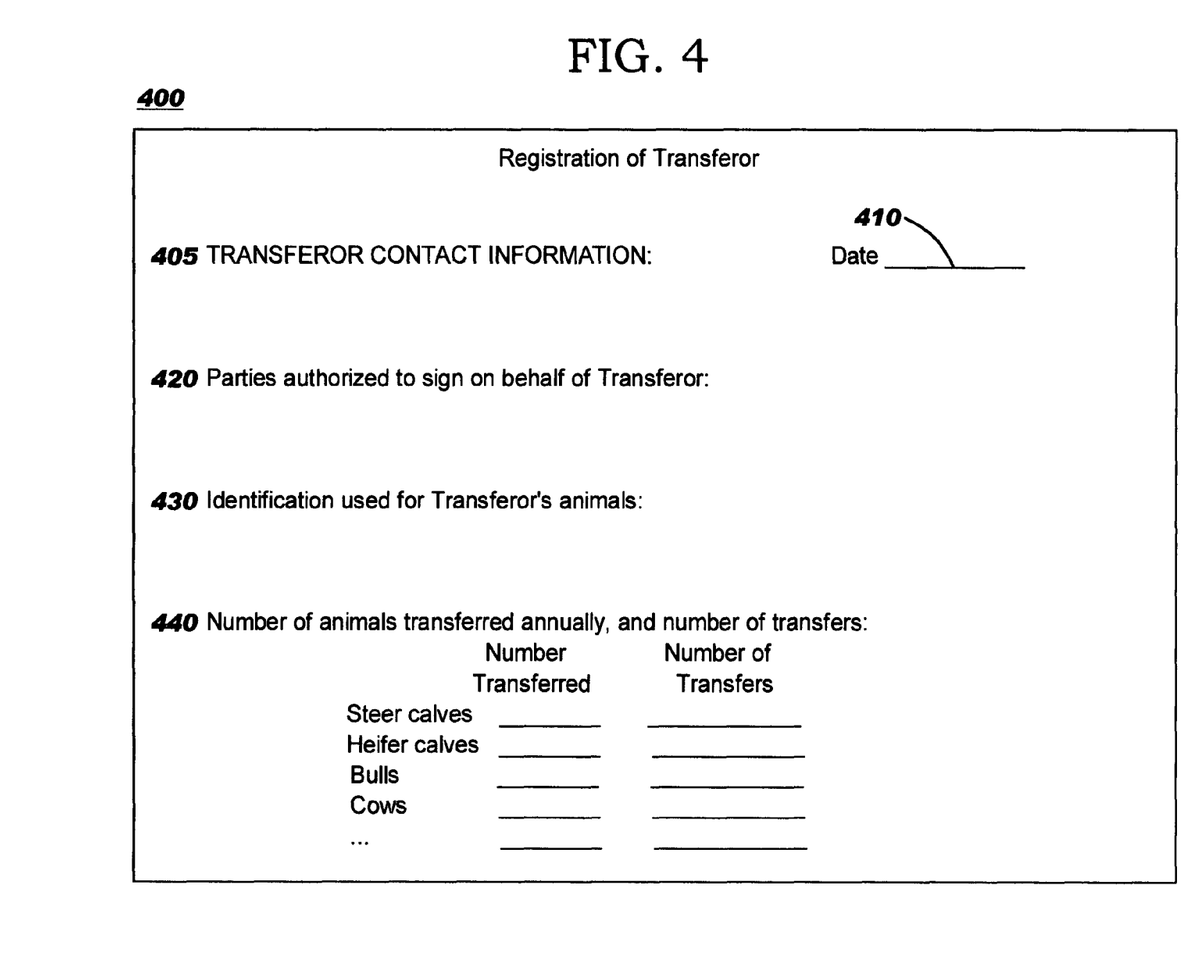
FIG. 4 is a sample registration form that may be used to gather information from parties who transfer animals.

Information related to those parties who are authorized to sign on behalf of the registering party is preferably specified, as illustrated at reference number 420. Optionally, information describing how this registering party typically identifies its animals may be provided (see reference number 430). In addition, an estimate of the number (and type) of animals transferred, and/or the number of transfers expected within a particular period, may also be deemed useful for the third party (as illustrated by reference number 440).

A farm or ranch owner, for example, completes a registration form of the type illustrated in FIG. 4. Auction barns, feedlots, and other parties that may transfer animals preferably complete a registration form as well. Note that while the example scenarios described above refer to transfers of live animals, this is by way of illustration and not of limitation. Parties that do not transfer live animals may register with the third party (e.g., in their capacity as a transferor of meat products) using a registration form similar to that shown in FIG. 4.

Preferably, completion of a registration form (and payment of a registration fee, according to preferred embodiments) triggers a distribution of some number of uniquely-numbered animal passport forms to the registering party. These passport forms are then maintained by that party, and one is completed upon each transfer of a group of animals. Thus, for example, an animal passport as illustrated at 200 in FIG. 2 might be completed by a rancher selling animals born on his ranch, and a passport as illustrated at 300 in FIG. 3A might be completed by an auction barn representative as the auction barn sells animals to a feedlot.

Distribution of multiple passport forms in this manner enables the parties to easily complete transfer documentation. As one alternative approach, uniquely-numbered passport forms may be distributed responsive to requests submitted at, or following, each animal transfer. As another alternative approach, an implementation of the present invention providing electronic animal passports may be configured to generate unique passport numbers as each passport is created (preferably, contemporaneously with an animal transfer).

Figure 5:
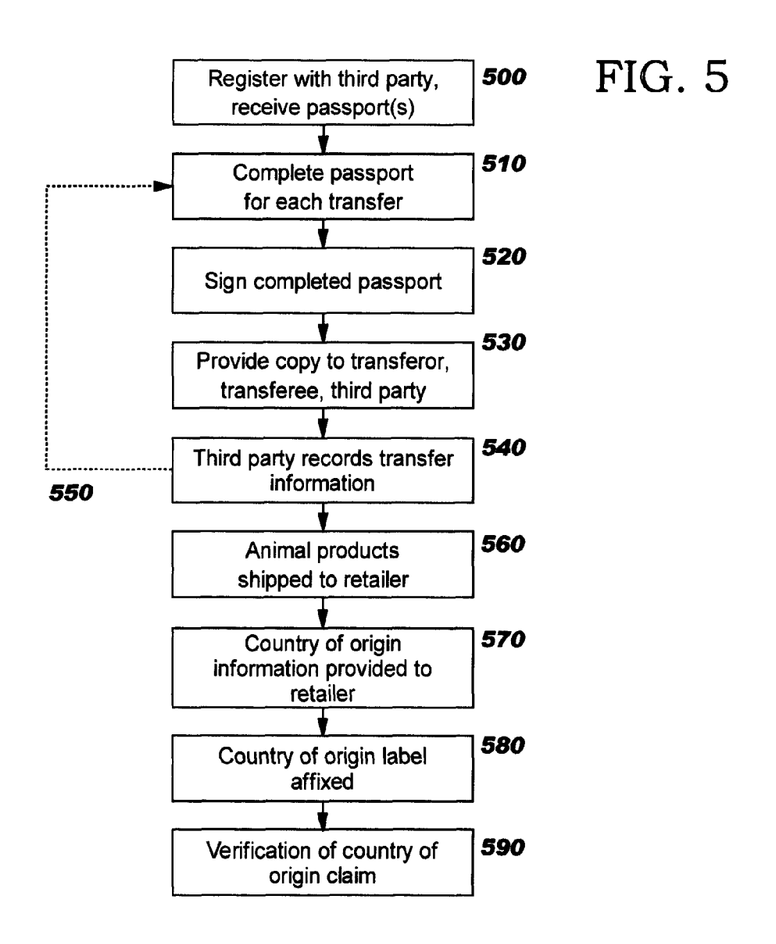
FIG. 5 provides a flowchart illustrating logic underlying operation of preferred embodiments of the present invention.

The party registration and distribution of animal passport forms (when applicable) to that party is shown at Block 500 in FIG. 5 as an initial step in the operation of preferred embodiments. Upon a transfer, a passport form is completed (Block 510), as has been illustrated with reference to the examples in FIGS. 2 and 3A-3B. The completed passport is signed (Block 520) by the transferor and transferee (or their agents, as has been discussed earlier), certifying the change in ownership. If the passport covers animals raised by the transferor, then his signature preferably certifies that the animals were raised on his premises and are being delivered to the party providing the second signature. Otherwise, these are animals the transferor previously obtained from another party. In this case, the transferor's signature preferably certifies that he has provided the proper passport number(s) previously associated with this group of animals, and that those animals were physically located within the United States at all times while owned by this transferor (with a possible exception in compliance with the caveat for transfer of cattle through Canada, specified at §282 (a)(2)(A) in the 2002 Farm Act).

In addition to certifying that the covered animals were located in the United States, the location(s) where they were kept may optionally be specified as well. Many registered parties may operate in a single physical location. In that case, specifying a transferring party's name on an animal passport provides information usable for identifying the location of the covered animals for the period of time represented by this passport. On the other hand, if the transferor operates in multiple locations, then a location or location identifier may be specified on the animal passport for this purpose. Or, in another approach, a separate registration may be required for each such location. In this latter case, an identifier such as a registration number may be uniquely associated with each registration, and specifying this registration number on an animal passport provides information usable for identifying the location of the covered animals for the relevant time period.

Optionally, an implementation of the present invention may be adapted for tracking transfers into the United States and/or out of the United States, in addition to transfers within the United States. Therefore, the transferor's signature may certify that the covered animals are being transferred from a foreign country, in which case the animal passport format is preferably adapted for recording the foreign country name or an identifier thereof.

Returning to the discussion of Block 520 in FIG. 5, the signature of the transferee preferably certifies that he took possession of the animals. Discussions above of preferred embodiments are in terms of a "buyer" or "new owner" taking ownership of the animals, and signing the passport accordingly. However, it may also happen that this second signer is not the true owner, but an agent of that owner. So, for example, an ordering agent might sign on behalf of the new owner. Or, an authorized person at an auction barn might sign for the new owner, or a trucker who loads the animals for delivery to the new owner might be authorized to sign the passport. In alternative embodiments, passports might be created to record each custodial or possessory transfer, even though an ownership change does not necessarily accompany each such transfer. In this alternative approach, for example, a passport may be created when a trucker takes possession of animals from their owner's premises for transportation to another location; thereafter, a new passport may be created when possession of those animals is transferred to another party such as a feedlot owner or an auction barn. (As will be obvious, while it provides more fine-grained information, this alternative approach increases the number of passports.)

Preferably, a copy of the completed passport is provided to the transferor and transferee, and the signed original is transmitted to the third party (Block 530). Information from this passport is recorded in the repository maintained by the third party (Block 540).

The processing of Blocks 510-540 may iterate, as denoted as 550, as subsequent transfers occur for covered animals or animal groups. Eventually, when animals covered by a passport (or sequence of passports, as described herein) are slaughtered, products (meat, in particular) from those animals are delivered to retailers (Block 560). According to the Farm Act of 2002, country of origin information must be provided to the retailer (Block 570) by suppliers of covered commodities, such that the retailer can affix a country of origin label (Block 580) or similar indicia. The animal passport techniques disclosed herein enable this country of origin information to be uniquely represented by the animal passports (and the transfers represented therein). Thus, a supplier of the animal products delivered at Block 560 preferably provides the retailer with a new passport of the form disclosed herein that documents the transfer to the retailer; or, if passports as disclosed herein are used only to document transfers of live animals, the supplier preferably provides a copy of the most-recent passport associated with the animals from which the animal products originated. (Alternatively, rather than providing copies of previously-issued passports, suppliers might provide retailers with passport numbers associated with those passports. Such passport numbers, having been recorded in a repository at Block 540, may be used to retrieve information usable for determining country of origin information. See, for example, the description of FIG. 6, discussing how information may be retrieved from a third-party repository.)

Having the passport number sequence associated with the delivered animal products, the retailer can easily construct a chain of transfers and can thereby demonstrate that the products to be sold at retail are within the legal requirements for the country of origin claim under the 2002 Farm Act. (This chain may be constructed by another and its end result provided to the retailer, although the retailer is ultimately responsible for ensuring that an accurate claim is made to the consumer.)

In some cases, packers may associate a "lot number" or similar identifier with covered commodities (recording, for example, an internal tracking number associated with the slaughter of a particular group of animals). The animal passport may optionally be extended to include this type of lot number. For example, suppose that Packer A designates meat processed on a certain date with a lot number "Packer_A_Oct202003". This lot number may be recorded on the outside of cases of the meat. Lot numbers may be associated with animal passport numbers such that a retailer receiving a case of meat can readily determine, from the lot number, the proper country of origin for this meat.

If verification of a country of origin claim is desired, the chain of passports (and underlying transfers) can readily be inspected through their unique passport numbers. This is represented at Block 590 of FIG. 5. This verification may be performed as an audit by the Secretary of Agriculture. The third party providing the passport system may enable others to perform verifications as well, if desired. One manner in which a verification feature may be provided is illustrated by the GUI display 600 in FIG. 6, as will now be described.

Figure 6:
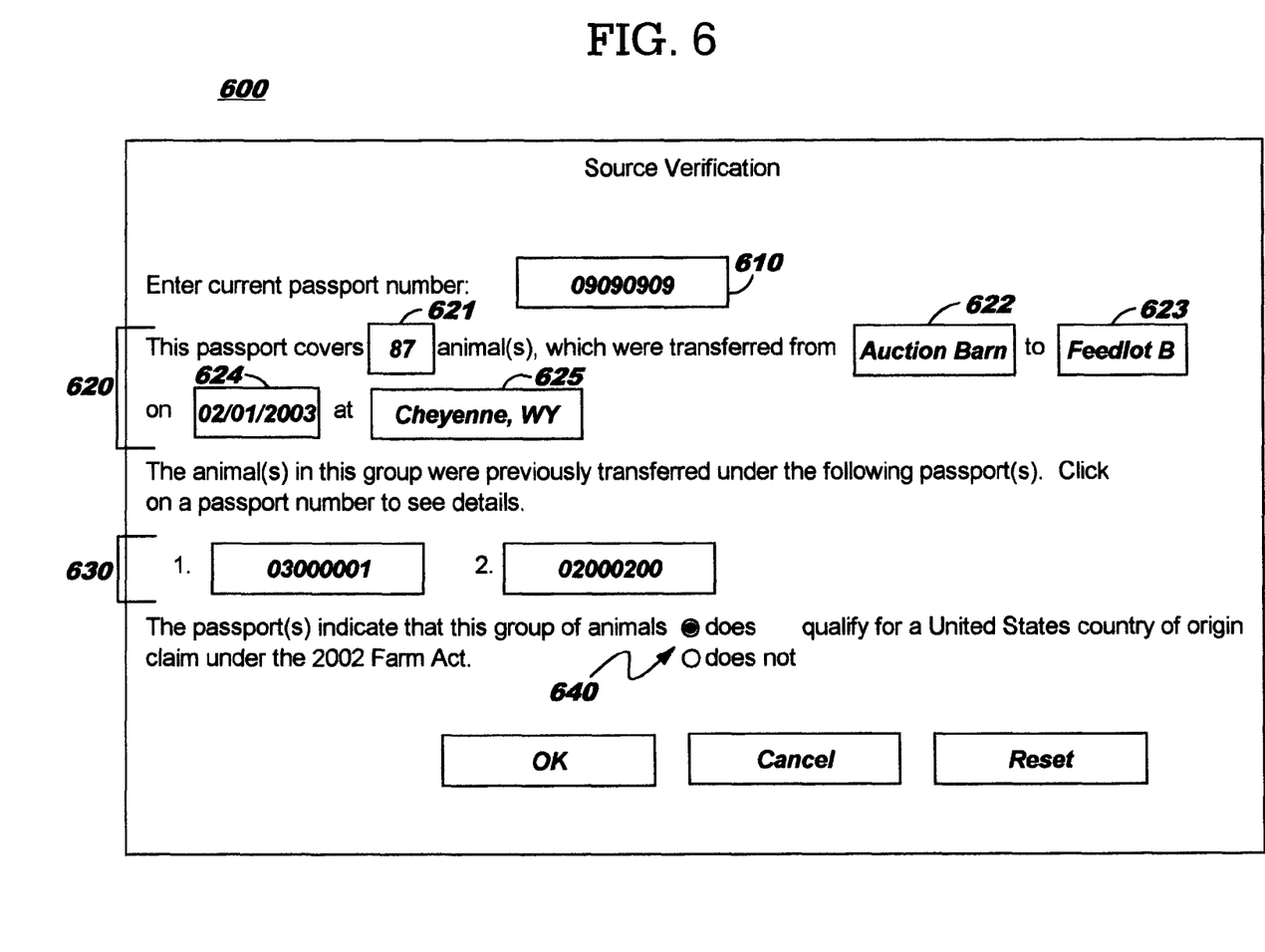
FIG. 6 illustrates a sample graphical user interface ("GUI") display that may be used to enable retrieval of information represented by animal passports.

FIG. 6 illustrates a sample GUI display 600 that may be used to enable retrieval of animal transfer information represented by animal passports. A GUI display of this type may be provided by the third party maintaining the repository in which animal passport information is stored. As will be obvious, the information depicted in sample display 600 is merely illustrative of the types of information that may be retrieved from the repository and the manner in which that information may be presented to an end user.

In this sample display, a data entry area 610 is provided for entering a passport number of interest. Passport number "09090909" has been entered in the example, and information (shown generally by reference numbers 620, 630) has been retrieved from the repository and used to populate the display 600. In particular, the number of animals covered by the entered passport number is retrieved and displayed at 621, along with an identification 622, 623 of the transferor and transferee associated with this passport (and the transfer it represents) and the date 624 and location 625 of the transfer.

The previous passport number(s) associated with the passport number entered at 610 are also retrieved and displayed, as shown at 630. Preferably, means are provided for easily retrieving information associated with those passports. In the example, instructions on the GUI inform the user that the displayed passport numbers can be clicked on to see details associated therewith (in which case a display providing information of the form shown in FIG. 6 is preferably provided for each such clicked-on passport number).

A GUI display provided for an implementation of the present invention may choose to present only the most-recent passport number(s), i.e., the passport number(s) recorded on the passport identified at reference number 610 (as has been illustrated at 630 in FIG. 6, where the passport numbers specified at reference numbers 391 and 392 in FIG. 3B are presented). In addition or instead, a GUI display may provide an at-a-glance view of the complete trail or chain of passport numbers. This information is preferably obtained by using the entered passport number ("09090909", in this example) to access the passport repository, locating each passport number associated therewith, and then recursively locating each passport number associated with those passport numbers until reaching source or original passports (i.e., passports having no previous passports associated with them, such as sample passport 200 of FIG. 2). This at-a-glance chain of passport numbers may be depicted in various manners. For example, a textual description or list may be provided, stating the previous passport number(s) associated with each passport number. Or, a graphical depiction (such as a hierarchical "tree" format) may be provided.

Sample GUI display 600 also illustrates a "does" or "does not" decision that may be made regarding whether the animals represented by the entered passport number qualify for a United States country of origin claim under the 2002 Farm Act. See reference number 640. Preferably, this is determined by tracing the animal passport chain to its origin, searching for any disqualifying transfers. One manner in which this may be determined will now be described with reference to FIG. 7.

Figure 7:
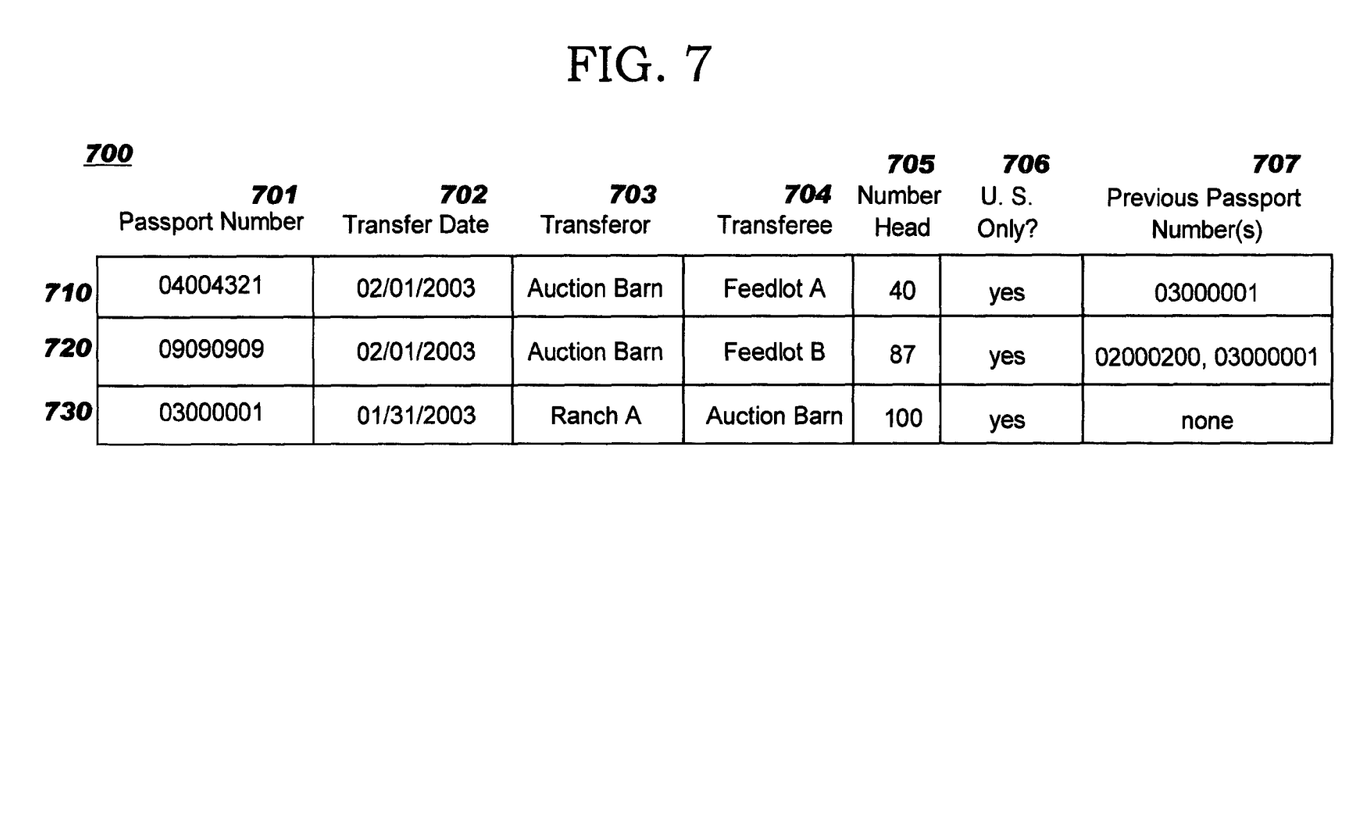
FIG. 7 illustrates a sample data structure that may be used to record animal passport information.

FIG. 7 illustrates a sample data structure 700 that may be used to record animal passport information. (Additional data structures, not shown, are preferably used to record other information such as details of party registrations.) GUI displays of the type illustrated in FIG. 6 may then be created by querying this data to provide information about particular passports. As shown in FIG. 7, a passport number field 701 is preferably used as an index to information stored in a repository (such as a database).

Additional information recorded in the passport repository for each passport preferably includes: the date 702 of the associated animal transfer; a name or identifier of the transferor(s) 703 and transferee(s) 704; the number of head 705 that were transferred; a yes/no indication 706 (which may be indicated using a bitstring or other shorthand representation) as to whether the animals were physically located within the United States (or were in transit through Canada as allowed by §282 (a)(2)(A) of the 2002 Farm Act) at all times relevant to this passport; and a list 707 of any previous passport numbers that were identified (preferably, by the transferor) on the subject passport.

In the sample data structure 700, three rows 710, 720, 730 are illustrated. These rows correspond generally to the sample passports depicted in FIGS. 3A, 3B, and 2, respectively. Row 720, in this example, corresponds to the information depicted in the sample GUI display 600 in FIG. 6.

If an embodiment of the animal passport system provides individual animal identification instead of identification of animal groups, data structure 700 may be modified accordingly. For example, an animal identifier field may be added to data structure 700, wherein an animal identifier may be specified. Or, when individual animal identifiers are recorded in addition to the preferred approach of tracking animal transfers by group, then an additional field in data structure 700 may specify some number of individual animal identifiers for the animals within this particular group (and the passport format is preferably adapted for specifying these animal identifiers as well); alternatively, a pointer or other reference to a separately-stored list of animal identifiers may be stored in data structure 700 in this case.

Additional types of information not shown in FIG. 7 may also be recorded in the passport repository (such as the location of transfer, capacity of signing transferor and/or transferee, and so forth).

As has been demonstrated, the present invention defines novel techniques for tracking information about animals and transfers thereof. This information may be used advantageously in a number of ways, including for source verification, for country of origin claim determination, and/or for verifying country of origin claims. As stated earlier, the animal passport techniques disclosed herein may be used for live animals and/or for animal products such as meat.

In alternative embodiments, the disclosed animal passports may be used for one or more of the other "covered commodities" addressed by the 2002 Farm Act. For example, passports may be created to document transfers of fish. The disclosed techniques may also be adapted for use with peanuts and/or perishable agricultural commodities. Recording transfers of such covered commodities using a passport system enables efficient retrieval of information that is usable in determining country of origin claims and/or in verifying those claims, in a similar manner to that which has been described above for animal passports of preferred embodiments.

While discussions herein are primarily in terms of recording transfers and locations within the United States, this is by way of illustration and not of limitation. Animal passports may include names or identifiers of other countries in which covered commodities were born, raised, or slaughtered, and this information may be captured in a passport repository (e.g., by extending the fields shown in FIG. 7 to include country identifiers). In cases where a covered commodity is not exclusively a product born, raised, and slaughtered in the United States, these extensions may be used in generating a country of origin label reflecting all pertinent countries.

It is noted that the Voluntary Guidelines state that, once a covered commodity reaches the "threshold point" at which the country of origin is determined, export of that commodity and subsequent re-import does not necessarily preclude a country of origin claim identifying the United States. That is, if the covered commodity is born, raised, and slaughtered in the United States (where these acts comprise a "threshold" established by the 2002 Farm Act) but the carcass is subsequently exported (e.g., for further cutting and packaging), then products resulting from processing the carcass in a foreign country still qualify for a U.S. country of origin claim "if a verifiable recordkeeping system is in place". Voluntary Guidelines, p. 63373. Accordingly, an implementation of the present invention may be adapted for enabling this type of verification. For example, a special designation might be provided on animal passports and/or in data structure 700 to indicate a "post-slaughter" transfer.

Preferably, access to a data repository containing information such as that illustrated in FIG. 7 is provided through an Internet or Web presence, such as a Web page provided by the third party maintaining the data repository. Retailers may then access this Web presence in real time (using, for example, a GUI display such as display 600 in FIG. 6) to check the passport chain for selected animal products (e.g., meat) or other covered commodities (as applicable), thereby determining what country/countries of origin should be stated on a country of origin label. Suppliers such as growers, auction barns, and feedlots may also be given access to this Web presence (or a similar retrieval mechanism). Optionally, fees may be charged for using the third party repository for this type of query. A repository of authorized users is preferably maintained using well-known techniques (such as a system verifying a user identification or "user ID" via a password), and the Secretary of Agriculture is preferably an authorized user (and is given free access).

Optionally, the third party may authorize others to enter passport information into the passport repository (preferably, through a user ID and password system or similar user authorization means). For example, personnel at auction barns may be authorized for this type of data input. In addition, automated systems may be adapted for interfacing with the animal passport repository to provide input directly into the passport repository. As an example, a software system with which auction barns process auction sales may be extended to capture information relevant to animal passports (or, animal passport information may be extracted from data already captured by such software), and this information may be electronically submitted to the third party repository.

By way of illustration but not of limitation, discussions herein refer to an animal passport repository maintained by a single third party. Alternatively, more than one repository may be used, where these multiple repositories are preferably operably interconnected, and/or responsibility for one or more animal passport repositories may be shared among multiple "third party" entities.

The passport techniques disclosed herein may also (or alternatively) be used for tracking other types of information. In livestock production, for example, it is often useful to maintain information about what vaccinations have been given to animals (and when), along with various types of information deemed advantageous for livestock management (such as weaning records, information about whether animals are trained for eating from feed bunks, whether any type of implants have been used on these animals, and so forth). Passports may be used for tracking events of this type, and relevant queries can then be issued against a repository of such passports, thereby providing (for example) an auditable trail that may be of interest to potential animal buyers. Queries of such information may also be used to reduce time and effort. For example, when it can be determined that vaccinations are current for animals arriving at a feedlot by following an audit trail using an animal passport, the feedlot may avoid duplicate vaccination of those animals. Or, this type of audit trail might be useful when animals are consigned to an auction barn, where a verifiable determination of vaccination history may lead to a higher selling price. As another example, events tracked using animal passports may be used to determine whether the covered animals qualify for claims of "implant-free" or "organic".

If a disease outbreak occurs in a foreign country, embodiments of the present invention that track animal transfers including those in foreign countries may be used to determine whether a particular animal or group of animals has ever been located in the affected country. Or, when a sequence of animal transfers is shown to place animals within the United States throughout their lifetime, it can be concluded that those animals were not located in the affected country.

Consumer confidence in animal products sold by retailers may be expected to improve when techniques disclosed herein are employed, as anticipated by the 2002 Farm Act.

Neither the Voluntary Guidelines or the 2002 Farm Act prescribes how country of origin information is to be documented, nor how audits or verification procedures are to be implemented. Examples of records that may be useful for country of origin verification purposes are provided by the USDA Agricultural Marketing Service ("AMS") as a one-page chart for each type of covered commodity. (For example, beef-related commodities are provided in one chart, pork-related commodities in another chart, and so forth.) The Internet-provided introduction to these charts states that while the charts provide examples, these examples, "although extensive, are not inclusive of all documents and records that may be useful to verify compliance". (See http://www.ams.usda.gov/cool/records.htm.) The one-page chart for cattle, for example, identifies approximately 46 different types of records (although some overlap may exist). (See http://www.ams.usda.gov/cool/coolbeef.pdf.) The Internet-provided introduction also states that the list of documents and records "will not necessarily ensure compliance" for country of origin labeling provisions of the 2002 Farm Act. This approach of specifying a voluminous number of records which may or may not be sufficient may result in confusion and uncertainty, as well as placing a serious administrative burden on producers. In contrast, animal passports as disclosed herein record information pertaining to tracking of animal transfers in a straightforward, efficient manner.

An advantage of using unique animal passport numbers, as disclosed herein, is that an auditable trail can be quickly established, and automated means may be easily created for performing this operation. For example, by review of the sample passports, data structure, and GUI display illustrated herein, one of skill in the art can readily construct a computer program for use in retrieving transfer information, checking a country of origin claim, and so forth.

Another advantage of the disclosed techniques is the flexible and efficient manner in which transfers of split groups and combined or co-mingled groups of animals can be documented (as has been explained with reference to the example transfers in FIG. 1, and more particularly with reference to sample passports in FIGS. 3A and 3B, above). Most animals are transferred in groups, rather than one at a time, and the disclosed techniques are designed to support group transfer scenarios.

The present invention has been described with respect to several variations of possible embodiments which are illustrative, and are not meant to and should not be construed to limit the invention. Those skilled in the art will understand that variations from the embodiments described herein may be made without departing from the invention as claimed in the appended claims.

In particular, while preferred embodiments have been described with reference to use of the animal passport system for tracking cattle, the teachings disclosed herein may be applied advantageously to other livestock as well as other covered commodities included under the 2002 Farm Act.

The present invention has been described herein with reference to flowchart illustrations. As will be obvious to one of ordinary skill in the art, these flowcharts are merely illustrative of the manner in which preferred embodiments of the present invention may be implemented, and changes may be made to the logic that is illustrated therein (for example, by altering the order of operations shown in some cases, by combining operations, etc.) without deviating from the inventive concepts disclosed herein. Embodiments of the present invention may be provided as methods, systems (apparatus), and/or methods of doing business. Embodiments of techniques disclosed herein may also or alternatively be provided as computer programs which store and/or retrieve animal passport information.

What is claimed is:

1. A method of tracking transfers of groups of animals with animal passports, the method comprising:
    creating an animal passport to represent a transfer of a first group of animals from a transferor to a transferee at a location, the first group comprising at least two animals and the location comprising at least one of a city and a state;
    assigning a unique passport identifier to the created animal passport, thereby providing a unique identifier for the transfer, the unique passport identifier being distinct from a timestamp;
    recording, for the created animal passport using a processor of a computer, the unique passport identifier assigned to the passport, a count of the animals in the first group, the location, an individual animal identification for each individual one of the animals in the first group, an identification of the transferor, and an identification of the transferee; and
    repeating the creating, the assigning, and the recording for each of at least one subsequent transfer of any of the animals in the first group as a subsequent group, wherein:
        the subsequent group for at least one of the at least one subsequent transfer contains different animals than the animals in the group of a next-preceding transfer;
        repeating the creating for each of the at least one subsequent transfer comprises creating a new animal passport for the each subsequent transfer;
        repeating the assigning for each of the at least one subsequent transfer comprises assigning a new unique passport identifier to the created new animal passport; and
        repeating the recording for each of the at least one subsequent transfer comprises recording, in addition to the new unique passport identifier assigned to the created new animal passport, the unique passport identifier assigned, by the assigning or a prior iteration of the repeating, to the animal passport created, by the creating or the prior iteration of the repeating, to represent the next-preceding transfer of any of the animals in the subsequent group.

2. The method according to claim 1, wherein each of the animal passports is signed, by the transferor and the transferee who are parties to the transfer represented by the signed animal passport, to certify the transfer.

3. The method according to claim 1, wherein the recording uses a repository that is maintained by a third party that is distinct from each transferor and each transferee who are parties to any of the transfers.

4. The method according to claim 1, further comprising using the unique passport identifier assigned to each transfer of any selected one of the animals to track all of the locations of the selected one of the animals.

5. The method according to claim 1, wherein a first of the animal passports is created for a first transfer following birth of the animals in the first group, and wherein repeating the creating continues for each subsequent transfer until death of the animals in a final subsequent group, the created animal passports thereby reflecting a complete lifetime of the animals in the final subsequent group and being usable to track all transfers of the animals in the final subsequent group throughout their lifetime.

6. The method according to claim 1, wherein the transfers are transfers of ownership.

7. The method according to claim 1, wherein the transfers are transfers of possession.

8. The method according to claim 1, wherein at least one of the transfers is a transfer of ownership and at least one of the transfers is a transfer of possession.

9. The method according to claim 1, wherein the creating, the assigning, and the recording are also repeated for subsequent transfers of animal products derived from the animals in the first and subsequent groups following slaughter of the animals in the first and subsequent groups.

10. The method according to claim 1, wherein at least one additional animal is included in one or more of the subsequent groups, and wherein the animal passport created for such subsequent transfers also records the unique passport identifier assigned to the animal passport created to represent the next-preceding transfer of a group in which each of the at least one additional animal was previously transferred.

11. The method according to claim 1, further comprising:
determining a country of origin for a selected animal using the unique passport identifier associated with each passport representing any group in which the selected animal has been transferred to determine, from the location recorded for each passport, all locations in which the selected animal has been located throughout its lifetime.

12. The method according to claim 1, further comprising:
determining, for a selected one of the animals, all locations in which the selected animal has been located throughout its lifetime using the location recorded for each animal passport representing any group in which the selected animal has been transferred; and
preparing a country of origin claim for the selected animal, using the determined locations, wherein the country of origin claim indicates whether the selected animal has been located only in a selected country throughout the lifetime of the animal.

13. The method according to claim 5, further comprising:
constructing a chain of transfers for a selected one of the animals using the unique passport identifier assigned to an animal passport created to represent a transfer at death of the selected one to determine the location of the transfer represented by the animal passport, and iteratively determining each previous location of the selected one by using the unique passport identifier recorded on the animal passport for the most-recent previous transfer to obtain the animal passport created to represent each previous transfer of the selected one, until reaching a first of the unique passport identifiers, which is recorded on the animal passport associated with the first transfer of the selected one, thereby determining all locations in which the selected one has been located throughout its lifetime; and
verifying a country of origin claim for the selected one by comparing the determined locations to one or more locations stated in the country of origin claim.

14. A method of providing country of origin claims, the method comprising:
completing, for every transfer of groups of animals from transferors to transferees, each group comprising at least two animals, a passport document to represent the transfer, wherein:
a first transfer of a first group of the animals is represented by a first passport document;
for each subsequent transfer of any of the first group of animals, as a subsequent group, the subsequent transfer is represented by a subsequent passport document, wherein at least one subsequent group contains at least one animal different from the animals in the group of a next-preceding transfer; and
each of the passport documents has associated therewith a unique passport identifier, thereby providing a unique identifier for the transfer, the unique passport identifier being distinct from a timestamp, the completing further comprising:
specifying, on each of the passport documents, a count of the animals transferred, an individual animal identification for each individual one of the animals transferred, and a location of the transfer, the location comprising at least one of a city and a state;
specifying, on the first passport document, the unique passport identifier associated therewith;
specifying, on each subsequent passport document, the unique passport identifier associated therewith as well as at least one next-preceding unique passport identifier, each of the at least one next-preceding unique passport identifier associated with a corresponding next-preceding transfer of any of the animals transferred in the subsequent group; and
signing the passport document, by the transferor and the transferee, to certify the transfer;
recording, using a processor of a computer, each of the transfers in a repository maintained by a third party who is distinct from the transferors and the transferees, further comprising:
creating an entry in the repository for each of the transfers, each of the entries comprising the unique passport identifier associated with the passport document representing that transfer, the count of the animals transferred, the individual animal identification for each individual one of the animals transferred, the location of the transfer, and for the subsequent passport documents, each of the at least one next-preceding unique passport identifier specified thereon for the corresponding next-preceding transfer; and
using the entries in the repository to determine, for a selected one of the animals using the processor of the computer, whether a country of origin claim can be made stating that the selected one was always physically located, from its birth to its death, in a particular country by comparing, in each of the entries that pertains to transferring the selected animal, the location to the particular country.

15. The method according to claim 1, wherein:
the animal passport is a printed document;
the unique passport identifier assigned to the animal passport document is assigned by a registrar, in advance of distributing the printed document for any transfer; and
the creating comprises entering, on the animal passport document, the count of the animals, the location, the individual animal identification for each individual one of the animals, the identification of the transferor, and the identification of the transferee that are used for the recording.

16. The method according to claim 15, wherein the unique passport identifier assigned to the animal passport document is encoded thereupon using a barcode.

17. The method according to claim 14, wherein the unique passport identifier specified on each passport document is encoded thereupon using a barcode.

18. The method according to claim 14, wherein the unique passport identifier specified on each passport document is assigned by a registrar, in advance of distributing the passport document for use with any transfer.

19. The method according to claim 18, wherein the distribution occurs responsive to the registrar registering an entity as a potential transferee or potential transferor.

* * * * *